United States Patent [19]

Amir

[11] Patent Number: 4,882,849
[45] Date of Patent: Nov. 28, 1989

[54] POSITION-ADJUSTING AND DISTANCE-MEASURING DEVICES PARTICULARLY USEFUL WITH MACHINE TOOLS

[76] Inventor: Shlomo Amir, 106 Machanayim Street, Tel-Aviv, Israel

[21] Appl. No.: 225,101

[22] Filed: Jul. 25, 1988

[30] Foreign Application Priority Data

Aug. 6, 1987 [IL] Israel .................................... 83471
Apr. 20, 1988 [IL] Israel .................................... 86130

[51] Int. Cl.⁴ ............................................ G01B 3/20
[52] U.S. Cl. .......................................... 33/567; 33/640
[58] Field of Search ................ 33/168 R, 168 B, 502, 33/638, 636, 640, 641, 645, 832, 562, 567, 567.1

[56] References Cited

U.S. PATENT DOCUMENTS

2,775,821  1/1957  Eipper et al. .......................... 33/630
4,334,363  6/1982  Stegemeyer ........................... 33/638

Primary Examiner—Harry N. Haroian
Attorney, Agent, or Firm—Benjamin J. Barish

[57] ABSTRACT

A position adjusting device for adjusting the position of an adjustable member with respect to a housing to which the adjustable member is mounted. The adjustable member is formed with two conical sockets having axes parallel to each other and spaced from each other in the direction of adjustment of the adjustable member. The housing threadedly receives two pins eccentrically disposed with respect to the sockets, such that threading one pin inwardly of its socket and the other pin outwardly of its socket moves the adjustable member in one direction, and threading the one pin outwardly of its socket and the other pin inwardly of its socket moves the adjustable member in the opposite direction.

13 Claims, 4 Drawing Sheets

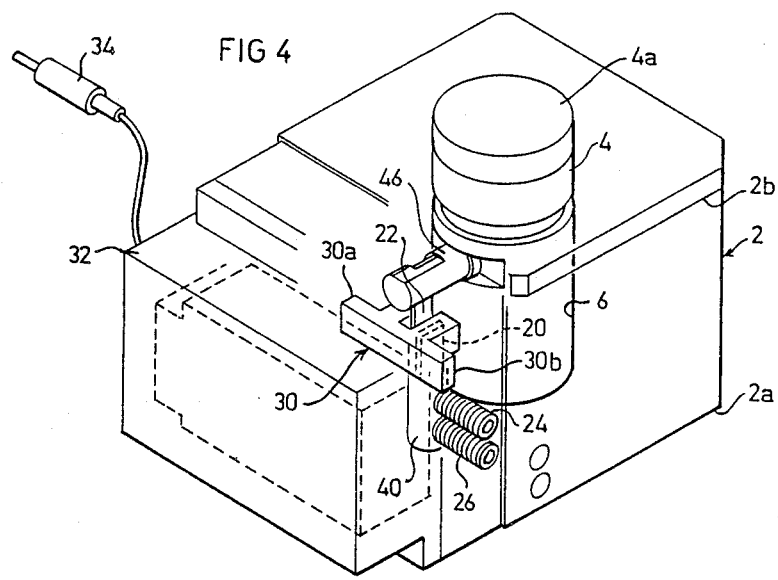
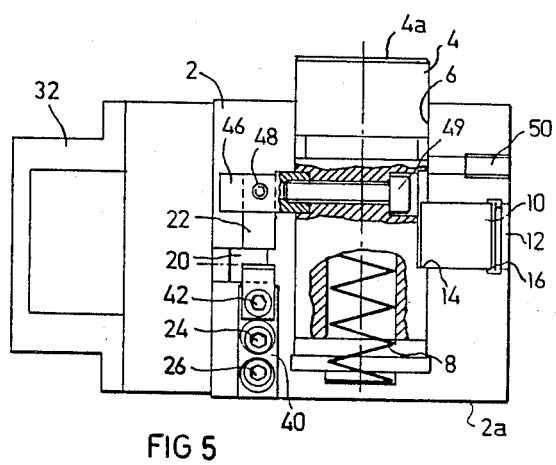
FIG 5
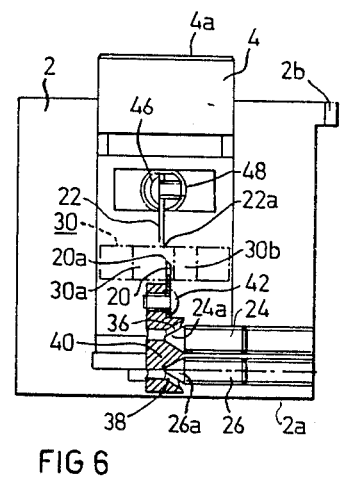
FIG 6

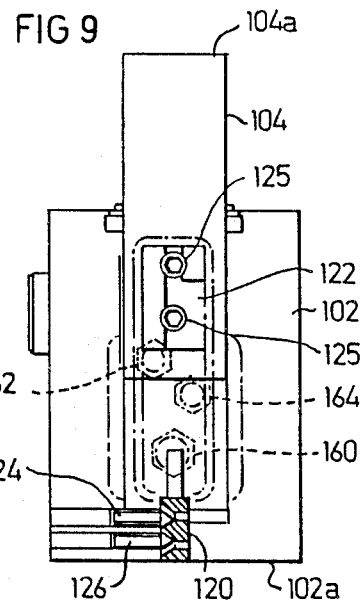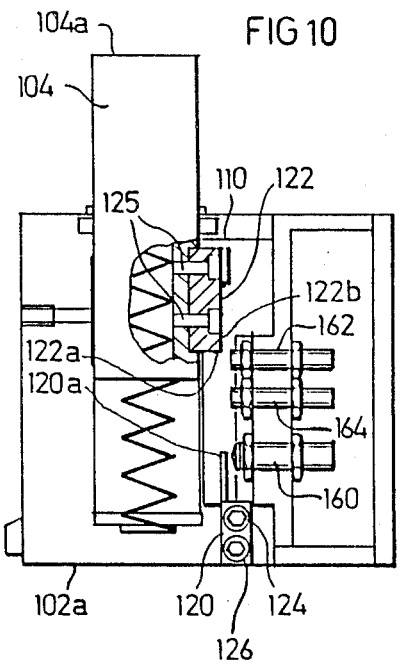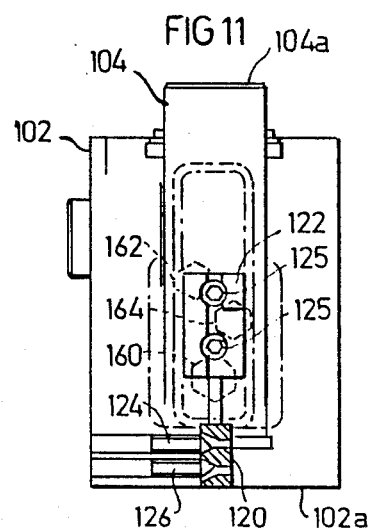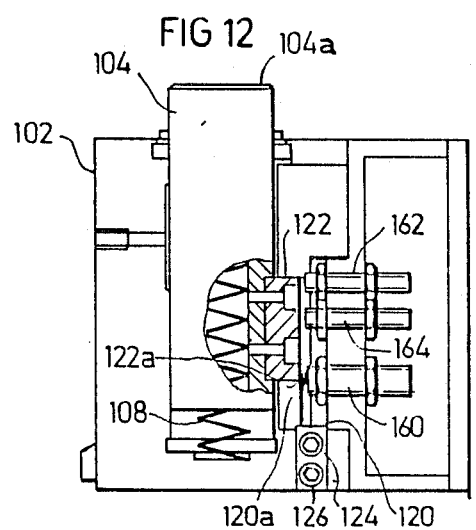

POSITION-ADJUSTING AND DISTANCE-MEASURING DEVICES PARTICULARLY USEFUL WITH MACHINE TOOLS

BACKGROUND OF THE INVENTION

The present invention relates to position-adjusting devices, and also to distance-measuring devices for measuring the distance between two objects. The invention is particularly useful with machine tools for measuring the distance of a machine tool from the workpiece, and is therefore described below with respect to this application, but it will be appreciated that the invention could advantageously be used in many other applications.

In automatic control of machine tools, it is necessary to fix the starting position of the machine tool a predetermined distance with respect to the workpiece so that all the instructions to the machine tool and/or workpiece can be based on this starting or reference position. At the present time, the measurement of this initial position of the machine tool with respect to the workpiece is usually done manually and is therefore a slow, cumbersome and error-prone operation which significantly slows-down the machining of workpieces.

An object of the present invention is to provide a position-adjusting device for adjusting the position of an adjustable member with respect to another member, e.g., a housing to which the adjustable member is mounted. Another object of the present invention is to provide a device for measuring the distance between two objects in an improved manner. A further object of the invention is to provide a distance-measuring device which is particularly useful with machine tools for measuring the distance of the machine tool from the workpiece.

BRIEF SUMMARY OF THE INVENTION

According to the present invention, there is provided a position-adjusting device for adjusting the position of an adjustable member with respect to a housing to which the adjustable member is mounted, characterized in that the adjustable member is formed with two conical sockets having axes parallel to each other and spaced from each other in the direction of adjustment of the adjustable member; and in that the housing threadedly receives two pins eccentrically disposed with respect to the sockets, such that threading one pin inwardly of its socket and the other pin outwardly of its socket moves the adjustable member in one direction, and threading the one pin outwardly of its socket and the other pin inwardly of its socket moves the adjustable member in the opposite direction.

According to another aspect of the present invention, there is provided a distance-measuring device for measuring the distance between two objects, comprising: a position-adjusting device as described above for adjusting the position of an adjustable member with respect to a housing, the housing having a first contact surface engageable with one of the objects, and the adjustable member including a first reference surface at a prefixed distance with respect to the first contact surface of the housing; a probe displaceably carried by the housing and having a second contact surface engageable with the other of the objects; and a second reference member having a second reference surface at a prefixed distance with respect to the contact surface of the probe and displaceable with the probe to provide a measurement, with respect to the first reference surface, of the distance between the two objects.

One embodiment of the invention is described below wherein the first and second reference surfaces have light-blocking edges, the distance measuring device further including an optical system for sensing when the light-blocking edge of the second reference member comes into alignment with the light-blocking edge of the first reference member for producing an output signal in response thereto.

A second embodiment of the invention is described, wherein the device includes a mechanical-type electrical switch actuated by the first reference surface when contacted by the second reference surface. In this embodiment, the device further includes a capacitance-type proximity switch, the probe having a third reference surface which actuates the proximity switch when the third reference surface is at a predetermined distance with respect to the proximity switch.

BRIEF DESCRIPTION OF THE DRAWINGS

The invention is herein described, by way of example only, with reference to the accompanying drawings, wherein:

FIG. 4 is a three-dimensional view of the distance-measuring device of FIG. 1, more particularly showing its internal structure;

FIG. 5 is a side-elevational view of the distance-measuring device of FIGS. 1-4;

FIG. 6 is a front-elevational view of the distance-measuring device of FIGS. 1-4;

FIGS. 9 and 10 are end and side views, respectively, partly broken away, illustrating the construction of the distance-measuring device of FIGS. 7 and 8 with the probe in the projected position; and FIGS. 11 and 12 are views corresponding to those of FIGS. 9 and 10 but with the probe in its retracted position.

DESCRIPTION OF PREFERRED EMBODIMENTS

The Embodiment of FIGS. 1-6

Figure 1:
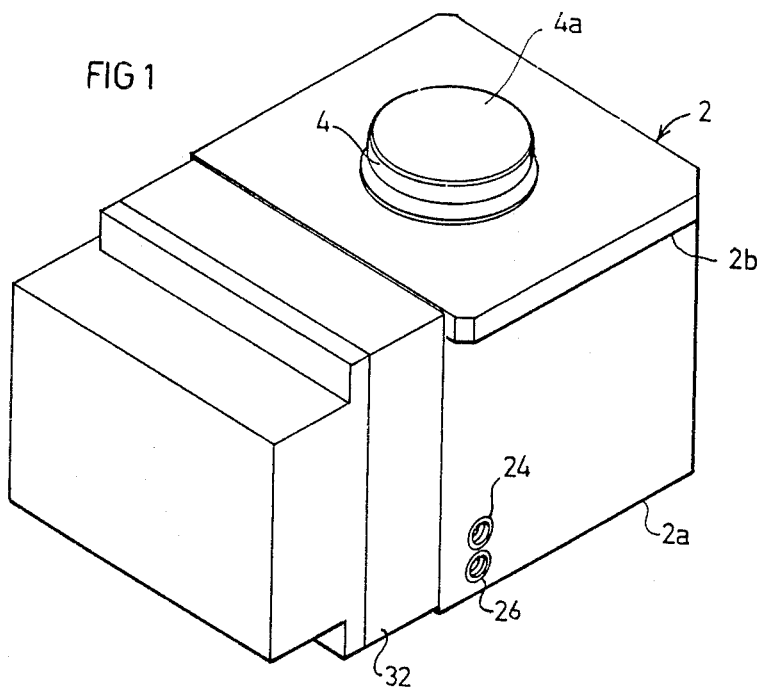
FIG. 1 is a three-dimensional view illustrating one form of distance-measuring device constructed in accordance with the present invention.

The distance-measuring device illustrated in FIGS. 1-6 of the drawings is particularly useful for measuring the distance of a machine tool MT (FIGS. 2, 3) from a workpiece WP, in order to assure that the machine tool is precisely located at a predetermined reference position with respect to the workpiece before the machine tool and/or workpiece is to be controlled according to predetermined programmed operations. The distance-measuring device illustrated in the drawings can be used for locating the machine tool MT with respect to the workpiece WP for performing either one of two operations: (1) for cutting or otherwise machining the face of the workpiece, this being the position of the machine tool illustrated in FIG. 2; or (2) for cutting or otherwise machining with reference to the edge of the workpiece, this being the position of the machine tool illustrated in FIG. 3.

Figure 2:
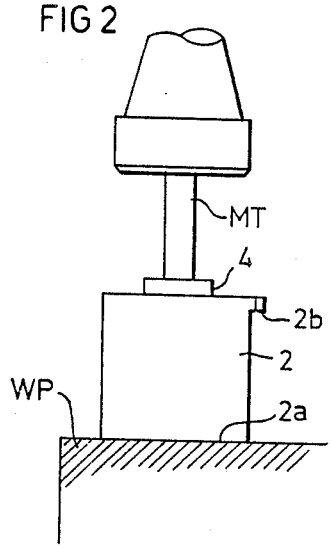
FIGS. 2 and 3 illustrate the manner of using the device of FIG. 1 for measuring the distance of a machine tool from a workpiece when the machine tool is to perform two different operations on the workpiece.
Figure 3:
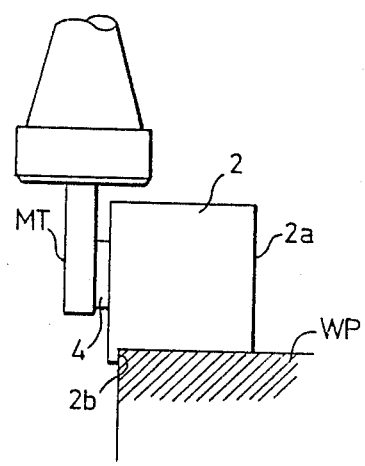
Figure 7:
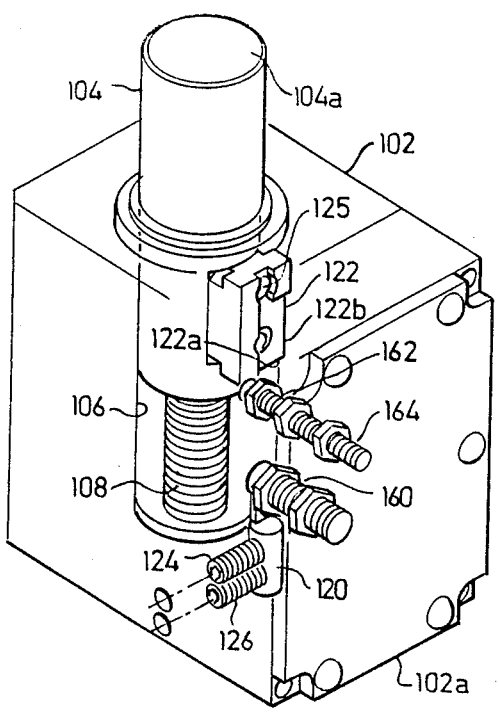
FIGS. 7 and 8 illustrate a second type of distance-measuring device constructed in accordance with the invention, with the probe in the projected and retracted positions, respectively.
Figure 8:
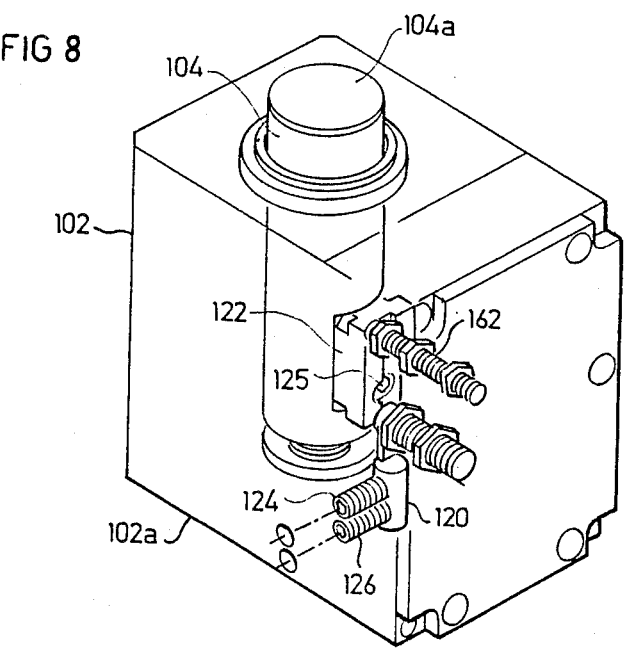

As shown particularly in FIGS. 1 and 4, the illustrated distance-measuring device comprises a housing, generally designated 2, having a first contact surface 2a for performing one of the machining operations (that illustrated in FIG. 2), and a second contact surface 2b for performing the other machining operation (that illustrated in FIG. 3). As shown in these two figures, the first contact surface 2a is defined by the flat bottom wall of the housing, whereas the second contact surface 2b is defined by a flat surface formed on a rib or flange projecting from the side wall of housing 2 parallel to the flat bottom surface 2a.

Housing 2 further includes a probe 4 of cylindrical configuration movable within a cylindrical cavity 6 formed in one end of the housing, namely the end opposite to its flat contact surface 2a. The outer surface 4a of probe 4 constitutes the contact surface engageable with the machine tool MT. Probe contact surface 4a is flat and is parallel to the housing contact surfaces 2a and 2b.

As shown particularly in FIG. 5, cylindrical probe 4 is urged by a spring 8 to position its contact surface 4a at a predetermined distance from both contact surfaces 2b of the housing. For this purpose, housing 2 includes a stop in the form of a pin 10 received within a bore 12 through the side wall of the housing. Pin 10 engages a shoulder 14 formed in the probe 4 to fix the projected position of the probe, and thereby the position of its contact surface 4a with respect to the two housing contact surfaces 2a and 2b. Pin 10 is retained within bore 12 of the housing by a retainer ring 16.

The illustrated distance-measuring device includes two reference members, one secured to the housing 2 and the other secured to the probe 4; these reference members measure the distance between the contact surface 4a of the probe 4 with respect to either of the two contact surfaces 2a or 2b of the housing 2, according to the two dispositions of the device as illustrated in FIGS. 2 and 3, respectively. As best seen in FIG. 6, the two members include blades 20, 22, having tapered surfaces at their confronting ends terminating in very thin light-blocking edges 20a, 22a, respectively. Blade 20 is fixed with respect to housing 2 but may be initially preset by a pair of screws 24, 26, to be described below, whereas blade 22 is fixed to probe 4 so that its light-blocking edge 22a is movable towards and away from the fixed light-blocking edge 20a of blade 20 with the movement of the probe 4 with respect to the housing 2.

An optical sensor, generally designated 30 in FIG. 6, senses and produces an electrical signal when the movable light-blocking edge 22a of blade 22 comes into precise alignment with the fixed light-blocking edge 20a of blade 20. Optical sensor 30 may be of any known construction, including a light source 30a on one side of the two blades, and a photocell (e.g., photodetector) 30b on the opposite side. The light beam from light source 30a to the detector 30b is thus interrupted by the light-blocking edges 20a, 20b, at the precise position when the two edges come into alignment with each other.

The electronic circuit associated with the optical sensor is contained within unit 32 (FIGS. 1 and 4) attached to one side of the housing 2. The signal produced by the optical sensor is outputted via an output plug 34 (FIG. 4) to an electronic control (not shown) for controlling the machine tool, when the two light-blocking edges 20a, 20b come into alignment with each other. This signal may be used for controlling the machine tool operations when performed either manually or automatically.

As indicated earlier, the position of the light-blocking edge 20b of blade 20 may be initially preset by the two threaded pins 24, 26. For this purpose, both pins are formed with conical heads 24a, 26a (FIG. 6) receivable within conical sockets 36, 38 formed in a carrier member 40 to which blade 20 is fixed by a pin 42. Carrier member 40 is in the configuration of a cylindrical rod received within a cylindrical bore formed in the housing, so as to be movable upwardly or downwardly by the rotation of the threaded pins 24, 26.

The two conical sockets 36, 38 have axes which are parallel to each other and spaced from each other in the direction of adjustment of the carrier member 40; and the two threaded pins 24, 26 are eccentrically disposed in their respective conical sockets. Thus, when pin 24 is rotated in one direction (threading the pin inwardly, FIG. 6), and pin 26 is rotated in the opposite direction (threading it outwardly), carrier member 40 is moved downwardly; and when pin 24 is rotated to thread it outwardly and pin 26 is rotated to thread it inwardly, carrier member 40 is moved upwardly. By adjusting pins 24, 26, the position of blade 20 may thus be initially preset to a precise position with respect to blade 22 carried by probe 4.

Blade 22 is fixed to one end of a cylindrical carrier member 46 by means of a fastener 48 (FIGS. 5, 6); the opposite end of carrier member 46 is fixed to the probe by another fastener 49 (FIG. 5). Thus, blade 22, and particularly its light-blocking edge 22a, will move with probe 4. A lubricating hole 50 (FIG. 5) is provided through housing 2 for adding lubricant to the outer surface of probe 4 to provide relatively friction-free movement of the probe within its socket 6.

The illustrated distance-measuring device may be used in the following manner, for example, to locate the machine tool MT (FIG. 2) at a distance of precisely 60 mm with respect to the face of workpiece WP.

First, the position of the fixed light-blocking edge 20a is preset. In this example, the contact surface 4a of the probe 4 in the fully-projected position of the probe (determined by pin 10 limiting against shoulder 14), is at a distance (e.g., 63 mm) slightly larger than this predetermined distance (60 mm). In such a case, a reference measuring device, e.g., a block or pin, of exactly 3 mm may be interposed between the machine tool MT and the contact surface 4a of probe 4, so as to depress the probe exactly 3 mm; any other means may be used for depressing probe 4 until its contact surface 4a is exactly 60 mm (in our example) from the contact surface 2a of the housing. The fixed blade 20a is then preset by moving pins 24, 26 in the manner described above, to precisely align the fixed light-blocking edge 20a with the movable light-blocking edge 22a secured to the probe. This precise alignment is sensed by the optical sensor 30.

After the fixed light-blocking edge 20a has thus been preset, the measuring device is then interposed between the workpiece WP and the machine tool MT, as shown in FIG. 2, such that the machine tool engages contact surface 4a of the probe 4 and depresses it within its socket 6 as the machine tool is advanced towards the workpiece. When the machine tool MT is at the precise distance from the workpiece, e.g., 60 mm, the light-blocking edge 22a of blade 22 carried by the probe comes into precise alignment with the light-blocking edge 20a of the fixed blade 20 carried by the housing 2. This will be sensed by the optical sensor 30 which outputs a pulse via its output plug 34 to the electronic control unit (not shown) of the machine. When such an output signal is produced, this means that the measuring tool MT is at the precise distance, e.g., 60 mm, from the workpiece WP in the arrangement illustrated in FIG. 2.

If the illustrated distance-measuring device is to be used in the operation illustrated in FIG. 3, wherein the machine tool MT is to perform an operation with reference to the edge of the workpiece WP, the distance-measuring device is oriented as shown in FIG. 3, wherein the housing contact surface 2b engages the edge of the workpiece WP, whereas the measuring tool MT engages the contact surface 4a of the probe 4. When the machine tool MT is precisely at the desired position from the edge of workpiece WP engaged by contact surface 2b of the distance-measuring device 2, this will be indicated by the output of an electrical signal via output plug 34 from the optical sensor 30 sensing the coming into precise alignment of the light-blocking edge 22a of blade 22 carried by probe 4, with the light-blocking edge 20a of blade 20 carried by the housing.

In the above description, this device is described as used for measuring the distance of the workpiece, but it will be appreciated that the measurements may also be with respect to any reference point on the machine.

The Embodiment of FIGS. 7-12

The distance-measuring device illustrated in FIGS. 7-12, like the device illustrated in FIGS. 1-6, is also particularly useful for measuring the distance of a machine tool from a workpiece except that it provides a greater degree of automatic control with respect to the predetermined programmed operations to be performed by the machine tool on the workpiece. To facilitate understanding, the parts in FIGS. 7-12 generally corresponding to those in FIGS. 1-6 are identified by the same reference numerals, except increased by "100".

Thus, the device illustrated in FIGS. 7-12 comprises a housing 102 having a contact surface 102a for performing a machining operation. Housing 102 further includes a probe 104 movable within a cylindrical cavity 106 formed in the end of the housing opposite to its flat contact surface 102a. The outer surface 104a of probe 104 constitutes the contact surface engageable with the machine tool. This surface is flat and is parallel to the housing contact surface 102a.

Probe 104 is urged by a spring 108 to position its contact surface 104a at a predetermimed distance from contact surface 102a of the housing. For this purpose, housing 102 includes a stop 110 (FIG. 10) engageable with a shoulder carried by the probe 104 to fix the projected position of the probe, and thereby the position of its contact surface 104a, with respect to the housing contact surface 102a.

The illustrated device includes a reference member 120 secured to the housing 102, and another reference member 122 secured to the probe 104. Reference member 120 is formed with a tongue 120a whose upper surface serves as a first reference surface; and the lower surface 122a of reference member 122 serves as a second reference surface engageable with tongue 120a when the plunger 104 is at a predetermined distance with respect to the contact surface 102a.

Reference member 120 is of similar construction as reference member 20 in the embodiment of FIGS. 1-6, and is similarly adjustable by means of a pair of threaded pins 124, 126, threadely received within threaded bores formed in the housing eccentrically with respect to conical sockets formed in reference member 120, as described above.

Reference member 122, however, is in the form of a metal block secured to the side of probe 104 by a pair of screws 125.

Whereas the distance-measuring device of FIGS. 1-6 includes an optical sensor for sensing the predetermined positions of the two reference surfaces (120a, 122a, in the embodiment of FIGS. 7-12), the distance-measuring device in the latter includes a mechanical-type electrical switch or microswitch 160, which is actuate when reference surface 122a is at the predetermined position with respect to reference surface 120a. In addition, the FIGS. 7-12 device includes two further switches 162, 164, these being capacitance-type proximity switches, which are actuated by the lower side face 122b of member 122, constituting a further reference surface carried by plunger 104 when that reference surface (122b) is at a predetermined position with respect to the contact surfaces 102a, 102b of the housing 102.

The device illustrated in FIGS. 7-12 may be used in the following manner:

First, the position of the adjustable reference member 120 is prefixed by threading the two threaded pins 124, 126 inwardly or outwardly with respect to their respective conical sockets in the housing 102, as described above. This positions the upper edge of tongue 120a, constituting the first reference surface, with respect to the lower edge 122a of block 122 carried by plunger 104 and constituting the second reference surface.

The working tool may be fed at a relatively high feeding rate towards the workpiece, depressing plunger 104 at the relatively high feeding rate. As soon as reference surface 122b of the plunger 104 is at a predetermined position with respect to proximity switch 162, the later switch is actuated to shiftover from a fast feeding rate to a slow measuring rate.

As plunger 104 is then depressed, at the slower rate, its reference surface 122a engages the upper surface of tongue 120a to actuate the microswitch 160 when the tool is at the desired precise critical position with respect to the workpiece.

Should the tool continue to feed towards the workpiece, this will further depress plunger 104 to bring its reference surface 122b into sufficient proximity with the second proximity switch 164 to actuate it. The actuation of the second proximity switch 164 may be used for energizing an emergency stop (not shown).

While the invention has been described with respect to one preferred embodiment, it will be apparent that many other variations, modifications and applications of the invention may be made.

What is claimed is:

1. A position adjusting device for adjusting the position of an adjustable member with respect to a housing to which the adjustable member is mounted, characterized in that the adjustable member is formed with two conical sockets having axes parallel to each other and spaced from each other in the direction of adjustment of the adjustable member; and in that said housing threadedly receives two pins eccentically disposed with respect to said sockets, such that threading one pin inwardly of its socket and the other pin outwardly of its socket moves the adjustable member in one direction, and threading the one pin outwardly of its socket and the other pin inwardly of its socket moves the adjustable member in the opposite direction.

2. The device according to claim 1, wherein each of said two pins is formed with a conical head disposed within its respective socket.

3. The device according to claim 1, wherein said adjustable member includes a blade at one end having an edge to be adjusted, and a base at the opposite end formed with said two conical sockets.

4. A device according to claim 3, wherein said base of the adjustable member is of cylindrical configuration, and said housing is formed with a cylindrical cavity receiving said base of the adjustable member.

5. A distance measuring device for measuring the distance between two objects, comprising:
   a position adjusting device for adjusting the position of an adjustable member with respect to a housing to which the adjustable member is mounted;
   said adjustable member being formed with two conical sockets having axes parallel to each other and spaced from each other in the direction of adjustment of the adjustable member;
   said housing threadedly receiving two pins eccentrically disposed with respect to said sockets, such that threading one pin inwardly of its socket and the other pin outwardly of its socket moves the adjustable member in one direction, and threading the one pin outwardly of its socket and the other pin inwardly of its socket moves the adjustable member in the opposite direction;
   said housing having a first contact surface engageable with one of the objects, and said adjustable member including a first reference surface at a prefixed distance with respect to said first contact surface of the housing;
   a probe displaceably carried by said housing and having a second contact surface engageable with the other of said objects;
   and a second reference member having a second reference surface at a prefixed distance with respect to said contact surface of the probe and displaceable with said probe to provide a measurement, with respect to said first reference surface, of the distance between the two objects.

6. The device according to claim 5, further including a spring urging said probe to position its second contact surface a predetermined distance with respect to said first contact surface of the housing.

7. The device according to claim 5, wherein each of said two pins is formed with a conical head disposed within its respective socket.

8. The device according to claim 5, wherein said adjustable member includes a blade at one end having an edge to be adjusted, and a base at the opposite end formed with said two conical sockets.

9. A device according to claim 8, wherein said base of the adjustable member is of cylindrical configuration, and said housing is formed with a cylindrical cavity receiving said base of the adjustable member.

10. The device according to claim 5, wherein said first and second reference surfaces have light-blocking edges, said distance measuring device further including an optical system for sensing when the light-blocking edge of the second reference member comes into alignment with the light-blocking edge of the first reference member for producing an output signal in response thereto.

11. A device according to claim 5, further including a mechanical-type electrical switch actuated by said first reference surface when contacted by said second reference surface.

12. The device according to claim 11, further including a capacitance-type proximity switch, said probe including a third reference surface which actuates said proximity switch when said third reference surface is at a predetermined distance with respect to said proximity switch.

13. The device according to claim 12, wherein there are two capacitance type proximity switches disposed with respect to said mechanical-type electrical switch, said first reference surface on said housing, and said second and third reference surfaces on said probe, being disposed such that the displacement of such probe into said housing first causes said second reference surface to actuate one of said proximity switches, then causes said first reference surface to actuate said electrical switch, and finally causes said third reference surface to actuate the other of said proximity switches.

* * * * *